United States Patent [19]

Hinkley

[11] Patent Number: 4,623,420
[45] Date of Patent: Nov. 18, 1986

[54] ANVIL FOR ULTRASONIC SLITTING APPARATUS

[75] Inventor: Charles H. Hinkley, Bethel, Conn.

[73] Assignee: Branson Ultrasonics Corporation, Danbury, Conn.

[21] Appl. No.: 742,048

[22] Filed: Jun. 6, 1985

[51] Int. Cl.[4] .................. B29C 65/08; B32B 31/18
[52] U.S. Cl. ................................ 156/515; 92/63; 92/130 D; 92/177; 92/DIG. 1; 156/73.3; 156/580.2
[58] Field of Search ............... 156/73.1, 73.3, 580.1, 156/580.2, 580, 515; 92/62, 63, 130 D, 135, 168, 177, DIG. 1; 228/1.1

[56] References Cited

U.S. PATENT DOCUMENTS

| 3,149,543 | 9/1964 | Naab | 92/DIG. 1 |
| 3,439,392 | 4/1969 | McNab, Jr. | 156/580.1 |
| 4,534,819 | 8/1985 | Payet et al. | 156/73.3 |

FOREIGN PATENT DOCUMENTS 2926258  4/1980  Fed. Rep. of Germany ... 92/130 D

Primary Examiner—Michael Wityshyn
Attorney, Agent, or Firm—Philip J. Feig; Ervin B. Steinberg

[57] ABSTRACT

An anvil for our ultrasonic textile slitting apparatus comprises an elongated, flat, substantially rectangular, housing in which two pistons are disposed for motion relative to one another along the longitudinal axis of the housing. A first piston, responsive to fluid pressure, is urged against the force exerted by springs into motion toward the second piston for causing the second piston, which is provided with a slitting implement, to be urged toward contact with the output surface of an ultrasonic horn. Further, springs are interposed between the first and the second piston for urging the pistons apart, but becoming compressed responsive to such fluid pressure. The combination of fluid pressure and springs causes the slitting implement to be kept in continuous contact with the horn despite the very high acceleration forces manifest at the horn output surface. In addition, the springs provide vibratory isolation from the vibratory energy of the horn. The flat anvil construction permits a plurality of anvils to be disposed in close proximity to one another for slitting textile material into narrow strips.

7 Claims, 3 Drawing Figures

ANVIL FOR ULTRASONIC SLITTING APPARATUS

BRIEF SUMMARY OF THE INVENTION

This invention relates to textile slitting apparatus and, more specifically, refers to an anvil construction for an ultrasonic slitting apparatus. Quite specifically, this invention concerns an anvil construction for an ultrasonic slitting apparatus wherein a plurality of anvils are in contact with an ultrasonic horn for slitting thermoplastic textile material, or material having a thermoplastic fiber content, into a plurality of narrow strips.

The use of ultrasonic energy for slitting textile material is well known in the art and has been described, for instance, in U.S. Pat. Nos. 3,378,429 dated Apr. 16, 1968 issued to E. Obeda; 3,737,361 dated June 5, 1973 issued to E. Obeda; 3,852,144 dated Dec. 3, 1974 issued to F. Parry, and 4,097,327 dated June 27, 1978 issued to P. Calemard.

The advantage of ultrasonic slitting over the conventional textile slitting process resides in the fact that simultaneously with the cut, a sealed edge is obtained on the textile material, thereby preventing the unraveling of threads or the appearance of a frayed edge. When slitting textile material into narrow strips, the anvil must be of substantially flat or narrow construction in order to permit a plurality of anvils to be positioned in close proximity to one another. Generally, a plurality of anvils operate in conjunction with a single ultrasonic horn, usually of blade type configuration. Textile material to be slit is fed through the nip between the anvils and the frontal or output surface of the horn.

When using ultrasonic energy for slitting, several unusual conditions not present in conventional slitting machines exist.

The anvil includes a slitting means which is urged against the output surface of the ultrasonic horn which is undergoing vibratory motion. The horn, when resonant at a typical operating frequency of 20 kHz, undergoes at its output surface a peak-to-peak amplitude excursion of 0.001 to 0.003 inches (0.025 to 0.076 mm). This motion at the stated ultrasonic frequency causes the presence of very high acceleration forces, in the order of several thousand g. Such forces cause the slitting means, which is urged against the output surface of the horn, to be repetitively impacted and driven away from the horn. However, in order to assure a continuous slitting operation without skipping any length of the material, it is essential that the slitting implement remain continuously in intimate contact with the output surface of the horn and follow the horn excursion despite the presence of the unique acceleration forces. Furthermore, the anvil is subject to severe vibratory forces which must be dealt with in a manner to provide the necessary vibratory isolation between the slitting implement and the remaining anvil structure. Last but not least, the anvil structure must be characterized by simplicity and highest reliability under these severe operating conditions.

The anvil described hereafter reveals a construction which has successfully been developed for ultrasonic slitting applications and which includes the unique dynamic features required to cause the slitting implement to be maintained in steady contact with the ultrasonic horn. In addition, the construction disclosed is of a flat configuration to permit anvils to be mounted in close proximity to one another.

One of the principal objects of this invention, therefore, is the provision of a new and improved anvil construction.

A further important object of this invention is the provision of a new and improved anvil construction including slitting means for use in ultrasonic textile slitting equipment.

A further important object of this invention is the provision of an anvil construction for ultrasonic textile slitting suited for the unique dynamic forces manifest in ultrasonic slitting.

Another important object of this invention is the provision of an anvil for an ultrasonic slitting apparatus, the anvil being of rectangular and relatively thin construction, thus permitting anvils to be mounted in close proximity to one another.

A still further and other important object of this invention is the provision of an anvil for an ultrasonic slitting apparatus, the anvil being characterized by simplicity and high reliability, and including means for causing a slitting implement, forming a part of the anvil, to be in continuous contact with the output surface of an ultrasonic horn.

Further and still other objects of this invention will be more clearly apparent by reference to the following description when taken in conjunction with the accompanying drawings.

DETAILED DESCRIPTION OF THE INVENTION

Figure 1:
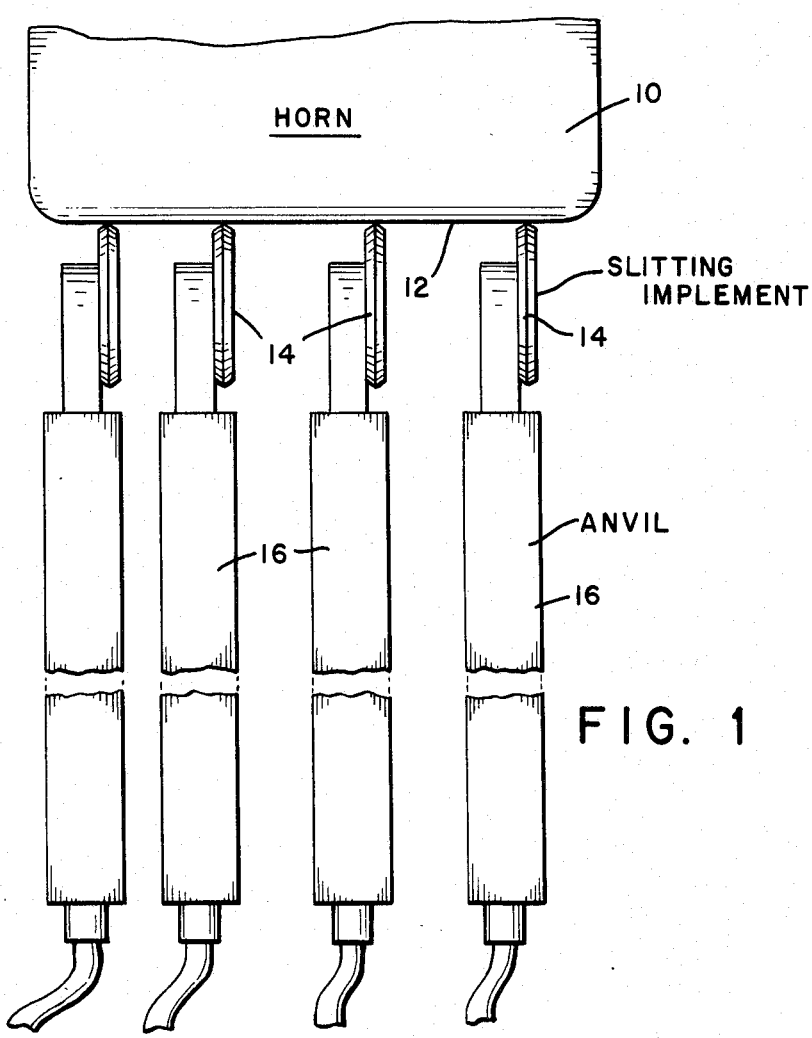
FIG. 1 is a partial elevational view of an ultrasonic slitting apparatus showing an ultrasonic horn and a plurality of anvils mounted in close proximity to one another.

Referring now to the figures, and FIG. 1 in particular, there is shown a portion of an ultrasonic horn, numeral 10, the frontal or output surface 12 of which is contacted by a plurality of slitting implements 14, each such slitting implement being a part of a respective anvil 16. The anvils 16 are elongated and of narrow rectangular shape so that a plurality of anvils, as shown, can be mounted in cooperative relationship with a single horn 10. Each slitting implement 14 is adapted to slit textile material fed through the nip between the slitting implement and the frontal surface 12 of the horn 14 so that the width of the resulting textile strips is determined by the spacing of the anvils and associated slitting implements.

The construction and operation of ultrasonic horns is well known in the art and can be found, for instance, in the book "Ultrasonic Engineering" by Julian R. Frederick, John Wiley & Sons, Inc., New York (1965), pages 87 through 103. In a preferred embodiment, the horn 10 is of blade-like construction as seen, for instance, in U.S. Pat. No. 4,363,992 issued on Dec. 14, 1982 in the name of E. Holze, Jr.

In a typical example, the horn 10 is dimensioned to be resonant at a predetermined frequency of 20 kHz, causing the frontal surface 12 to undergo a motional excursion in the order of 0.001 to 0.003 inch (0.025 to 0.076 mm) at this predetermined frequency. It should be apparent that any other frequency in the range between 10 kHz and 60 kHz may be selected for slitting, provided that the material and other operating conditions are suitable.

Figure 2:
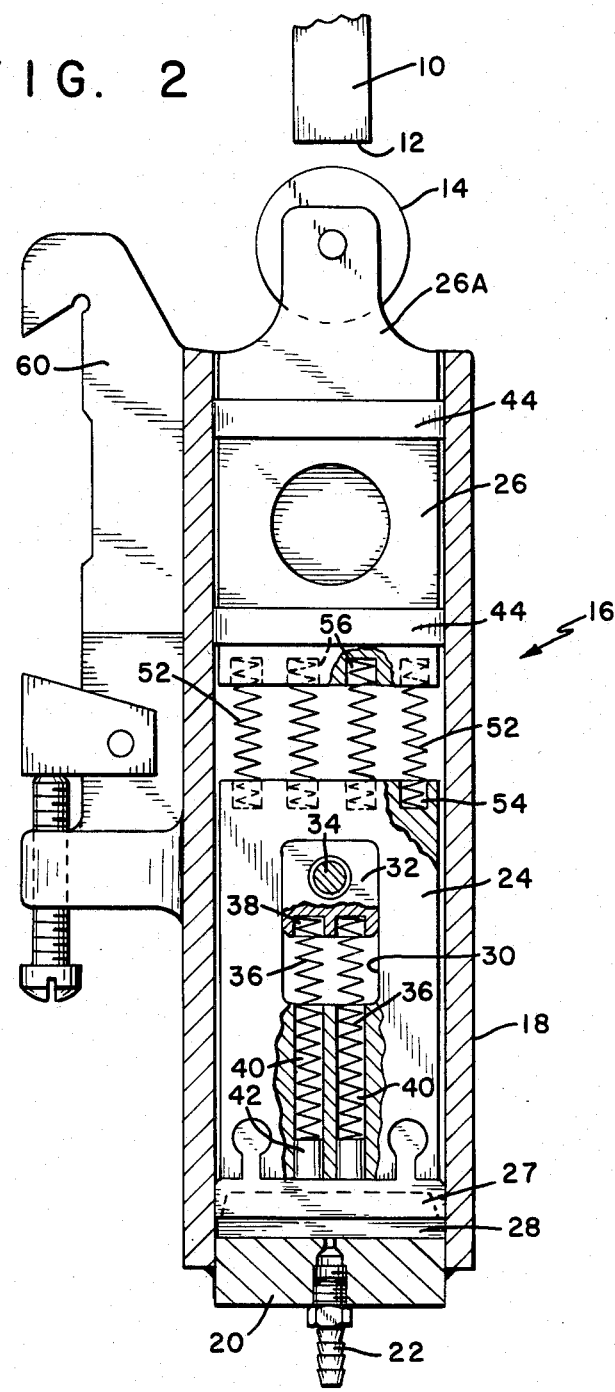
FIG. 2 is a sectional view of a preferred embodiment of the anvil construction.

Referring now to FIG. 2, there is shown the anvil assembly 16. The anvil assembly comprises a housing 18 which is made, for instance, from one-half inch thick brass plate stock and includes a flat cover, or, alternatively, the plate stock is hobbed out to provide an internal cavity for receiving the various parts. The lower end of the housing 18 is sealed by a plug 20 which is brazed to the housing. A fluid connecting coupling 22 is threaded to the plug 20 to be connected to a fluid source for providing fluid pressure to the inside of the housing 18. Within the housing there are disposed two pistons 24 and 26 of rectangular cross-section, spaced from one another, and adapted to move with respect to each other. The lower end of the piston 24 is provided with a cup shaped fluid seal 27 to provide a chamber 28 adapted to be pressurized with fluid supplied through the coupling 22. In addition, the piston 24 is provided with an internal rectangularly shaped aperture 30 within which there is disposed a guide 32 fixedly secured to the housing 18 by means of a pin 34. The guide 32, in conjunction with the aperture 30, limits the longitudinal motion of the piston 24. The piston 24 is urged away from the position of piston 26 and urged toward the lower end of the housing 18 by a set of helical compression springs 36 which, at one end thereof, are confined in respective bores 38 of the guide 32 and which, at the other end, are confined in respective bores 40 of the piston 24. Each bore 40 is sealed off by a plug 42 which acts as a seat for the associated spring 36.

The upper piston 26 is provided with a pair of polymeric plastic bearing bands 44 for guiding the piston 26 within the housing 18 and isolating the piston 26 from the vibrations transmitted by the horn upon the slitting implement 14 attached to an upper extension 26A of the piston 26.

Figure 3:
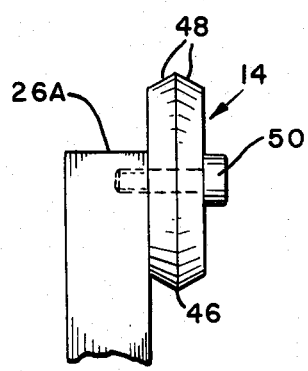
FIG. 3 is a view of the slitting implement.

The slitting implement 14, as shown in FIG. 3, comprises a wheel having a centrally disposed peripheral cutting surface 46 and a pair of adjoining inclined sealing surfaces 48. A screw means 50 fastens the wheel to the extension 26A. As a portion of the cutting surface which is in contact with the horn frontal surface becomes worn, the wheel 14 is slightly rotated to expose another portion of the cutting surface 46 to the horn. Alternatively, the slitting implement 14 can be rotatably mounted to the extension 26A.

Referring to FIG. 2, plurality of helical compression springs 52 exert a force for urging the piston 26 away from the piston 24 and thereby urging the piston 26 in a longitudinal direction toward the horn 10. Each spring 52 is secured by means of epoxy or other suitable means at one end in a respective bore 54 of the piston 24 and at the other end in a respective bore 56 of the piston 26. The purpose of the epoxy fastening will be explained below. The springs 52 also provide vibratory isolation for the vibrations originating at the horn and imparted to the slitting implement 14.

The anvil housing 18 is provided, moreover, with a dovetail mount 60 and associated hardware to clamp the anvil mechanism 16 upon a rail of a conventional textile slitting machine. The dovetail mount 60 is well understood in the art and need not be described in detail and does not form a part of this invention.

Operation of the mechanism described hereinabove can be visualized as follows:

Responsive to fluid pressure applied through coupling 22, the chamber 28 is pressurized, causing the piston 24 to be driven upward, as shown, against the force exerted by the springs 36. The motion of the piston 24 toward the piston 26 compresses the springs 52 and urges the cutting implement against the underside 12 of the horn 10. The combination of fluid pressure in chamber 28 and the spring forces causes the slitting implement 14 to be retained in continuous contact against the output surface 12 of the horn 10 despite the high acceleration forces manifest at the output surface of the horn, which forces tend to cause the slitting implement 14 to be urged away from the horn 10. The continuous contact of the slitting implement 14 against the output surface 12 of the horn 10 prevents any portion of the material passing through the nip from not being slit.

As shown in FIG. 2, the horn 10 is mounted above the anvils 16. In many applications it desireable that the horn 10 be mounted below the anvils 16, causing the anvils to be mounted in an inverted position from that shown in FIG. 2. When a horn is present, the travel of the piston 26 is limited. However, when a horn is replaced or during mounting of the anvils, the piston 26 could slide out of the housing absent the securing of the compression springs 52 in their respective bores 54, 56. As stated previously, one suitable method of securing the springs 52 is the use of epoxy resin for holding the spring ends in the respective bores.

By undercutting the surface of the bearing bands 44 at the extended flat surfaces and by providing a further air fitting at the side of the housing 18, it will be possible to flow a steady stream of air through the inside of the anvil, such air stream venting to ambient along the extension 26A supporting the slitting implement 14. The air flow through the housing continuously purges the inside of the anvil mechanism to keep it free of contamination and, in addition, the outflow of air impinges upon the horn 10 for providing cooling.

An anvil construction successfully tested had the following dimensions and characteristics: thickness of housing 18 was 0.500"; total length of anvil including slitting wheel 6¾"; cutting wheel diameter=1"; piston 24: length 2.56"; width 1.504"; thickness 0.250"; piston 26 including extension 26A: length 3.38"; thickness 0.250", width 1.504; engagement force of wheel against horn: variable from 5 lbs. to 25 lbs. by adjusting fluid (air) pressure between 30 and 90 PSI; four springs 52 used to provide substantial vibratory isolation; combined spring rate of springs 52 was 84 pounds per inch. The anvil disposed in its inverted position from that shown in FIG. 2 and absent fluid pressure, the gap between the wheel 14 and frontal surface of the horn was ⅛"; maximum stroke of piston 24: 0.44 inch.

While there has been described and illustrated a preferred embodiment of the anvil construction for use in an ultrasonic slitting apparatus, it will be apparent to those skilled in the art that various changes and modifications can be made without deviating from the principle of the invention which shall be limited only to the scope of the appended claims.

What is claimed is:

1. An anvil for an ultrasonic slitting device comprising:
   a substantially rectangular, elongated housing;
   a first and a second piston slidably mounted in spaced relation to one another within said housing for limited motion relative to one another along the longitudinal axis of said housing;

an aperture disposed in said first piston;

a guide disposed in said aperture and secured to said housing for guiding and limiting the motion of said first piston along said longitudinal axis;

first spring means disposed between said guide and said first piston for urging said first piston toward one end of said housing;

means disposed at said one end of said housing for causing responsive to fluid pressure said first piston to be driven in a direction away from said one end and counter to the force exerted by said first spring means;

second spring means disposed between said first piston and said second piston for urging said second piston in a direction along said longitudinal axis away from said first piston and toward the other end of said housing, and slitting means extending from said other end of said housing and mounted to said second piston for being responsive to the motion of said second piston along said longitudinal axis.

2. An anvil as set forth in claim 1, said housing and said first and said second pistons being of substantially rectangular cross-section.

3. An anvil as set forth in claim 2, said first spring means and said second spring means, each comprising compression springs.

4. An anvil as set forth in claim 2, said first and said second spring means, each comprising a plurality of helical compression springs.

5. An anvil as set forth in claim 2, said first piston including a seal for providing a chamber with the inside of said housing for receiving the fluid pressure.

6. An anvil as set forth in claim 2, said second piston including a pair of polymeric plastic bearing means contacting the housing for providing vibratory isolation.

7. An anvil as set forth in claim 2, said slitting means comprising a wheel having a centrally disposed peripheral cutting surface.

* * * * *